United States Patent
Yano et al.

(10) Patent No.: US 11,184,506 B2
(45) Date of Patent: Nov. 23, 2021

(54) IMAGE PROCESSING SYSTEM, CONTROL METHOD, AND STORAGE MEDIUM

(71) Applicant: CANON KABUSHIKI KAISHA, Tokyo (JP)

(72) Inventors: Takaaki Yano, Tokyo (JP); Aya Ito, Tokyo (JP); Tomohisa Itagaki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 16/418,306

(22) Filed: May 21, 2019

(65) Prior Publication Data

US 2019/0387130 A1 Dec. 19, 2019

(30) Foreign Application Priority Data

Jun. 15, 2018 (JP) .............................. JP2018-114904

(51) Int. Cl.
*H04N 1/60* (2006.01)
*G06F 3/12* (2006.01)
*H04N 1/407* (2006.01)

(52) U.S. Cl.
CPC ......... *H04N 1/6005* (2013.01); *G06F 3/1242* (2013.01); *H04N 1/407* (2013.01); *H04N 1/6094* (2013.01)

(58) Field of Classification Search
CPC .. H04N 1/6005; H04N 1/6097; H04N 1/6094; H04N 1/603; H04N 1/00005; H04N 1/00034; H04N 1/2307; H04N 1/407; G06F 3/1242; B41J 29/393
See application file for complete search history.

(56) References Cited

U.S. PATENT DOCUMENTS

| | | | | |
|---|---|---|---|---|
| 6,707,573 B1* | 3/2004 | Ito | ........................ | H04N 1/6052 358/1.9 |
| 10,839,271 B2* | 11/2020 | Itagaki | ............... | G06K 15/1878 |
| 10,999,477 B2* | 5/2021 | Ito | ........................ | H04N 1/6005 |
| 2003/0188393 A1* | 10/2003 | Tindal | .................... | D21H 21/28 8/532 |
| 2007/0014616 A1* | 1/2007 | Kinoshita | ............. | G06F 3/1245 400/76 |

FOREIGN PATENT DOCUMENTS

| | | |
|---|---|---|
| CN | 101713942 A | 5/2010 |
| JP | 2002139381 A | 5/2002 |
| JP | 2002-292909 A | 10/2002 |

* cited by examiner

*Primary Examiner* — Brandon J Miller
(74) *Attorney, Agent, or Firm* — Canon U.S.A., Inc. IP Division

(57) ABSTRACT

An image processing system includes an image forming apparatus, and an image processing apparatus connected to the image forming apparatus. The image forming apparatus forms an image, acquires a chromaticity value that is a result of measurement of a sheet on which the image is formed with use of a sensor in which a characteristic of a light source is fixed, and transmits the acquired chromaticity value to the image processing apparatus. The image processing apparatus receives the transmitted chromaticity value, specifies a condition when the result of the measurement using the sensor is acquired, and converts the received chromaticity value with use of the specified condition and information regarding an amount of an optical brightening agent contained in the sheet on which the image is formed.

8 Claims, 10 Drawing Sheets

FIG.8

| PRINT AND MEASURE PATCH CHART | | |
|---|---|---|
| PRINTING AND MEASUREMENT CONDITION OF PATCH CHART | | |
| PATCH SET | 1617 | ~UI802 |
| PATCH SIZE | A3 | ~UI803 |
| MEASUREMENT CONDITION | M1 | ~UI804 |

UI801

UI805: CANCEL
UI806: PRINT AND MEASURE

FIG.9

REGISTER SHEET INFORMATION — UI901

SHEET INFORMATION

| NAME | USER SHEET A | CHANGE ▷ | UI902 |

| GRAMMAGE | 120 gsm | CHANGE ▷ | UI903 |
| SIZE | A3 | CHANGE ▷ | UI904 |
| SURFACE PROPERTY | HIGH-QUALITY PAPER | CHANGE ▷ | UI905 |
| AMOUNT OF OPTICAL BRIGHTENING AGENT | SMALL | CHANGE ▷ | UI906 |

CANCEL — UI907

REGISTER — UI908

IMAGE PROCESSING SYSTEM, CONTROL METHOD, AND STORAGE MEDIUM

BACKGROUND

Field of the Disclosure

The present disclosure generally relates to image processing and, more particularly, to an image processing system, a control method, and a storage medium capable of acquiring a chromaticity value in conformity with a desired measurement condition even with use of a color measurement device in which a characteristic of a light source is fixed.

Description of the Related Art

Conventionally, various color management techniques have been implemented on printing apparatuses. Examples thereof include calibration for correcting a color tone of an image output from the printing apparatus, a technique for generating a profile so as to enable a desired color to be output in the output image, and a technique for determining whether the color of the image output from the printing apparatus matches a reference (i.e., color verification).

In recent years, optical brightening agents (OBAs) have been used in a wide range of sheets. An OBA is used for the purpose of enhancing brightness of the sheet and improving an appearance of a printed product. The OBA works based on the fluorescent principle, and therefore absorbs ultraviolet (UV) radiation at a wavelength of 400 nanometers (nm) or shorter and emits light mainly in a blue visible spectrum at 400 to 450 nm. Therefore, when the sheet containing the OBA is irradiated with the light containing UV, a paler appearance is created because of an addition of the fluorescent radiation light in addition to reflected light.

Japanese Patent Application Laid-Open No. 2002-292909 discusses a technique for faithfully outputting a color of original image data without being affected by the irradiation light of OBA to resolve a difference between a colorimetric value and an actually perceived appearance on the sheet containing the OBA.

SUMMARY

According to an aspect of the present disclosure, an image processing system includes an image forming apparatus, and an image processing apparatus connected to this image forming apparatus. The image forming apparatus includes an image forming unit configured to form an image, an acquisition unit configured to acquire a chromaticity value that is a result of measurement of a sheet on which the image is formed by the image forming unit with use of a sensor in which a characteristic of a light source is fixed, and a transmission unit configured to transmit the chromaticity value acquired by the acquisition unit to the image processing apparatus. The image processing apparatus includes a reception unit configured to receive the chromaticity value transmitted by the transmission unit, a specifying unit configured to specify a condition when the result of the measurement using the sensor is acquired, and a chromaticity value conversion unit configured to convert the chromaticity value received by the reception unit with use of the condition specified by the specifying unit and information regarding an amount of an optical brightening agent contained in the sheet on which the image is formed by the image forming unit.

Further features of the present disclosure will become apparent from the following description of exemplary embodiments with reference to the attached drawings.

BRIEF DESCRIPTION OF THE DRAWINGS

FIG. 8 is a diagram illustrating one example of a user interface (UI) on which a measurement illumination condition (i.e., a measurement condition) is input.

FIG. 9 is a diagram illustrating one example of a UI on which sheet information is registered according to a second exemplary embodiment.

DESCRIPTION OF THE EMBODIMENTS

Various exemplary embodiments, features, and aspects of the present disclosure will be described in detail below with reference to the accompanying drawings.

"M" in International Organization for Standardization (ISO) 13655-2009 has been defined by ISO as new standard illumination conditions (i.e., measurement illumination conditions) for color measurement devices with ultraviolet light taken into consideration therein.

The standard includes definitions about a measurement illumination condition "M0" without ultraviolet light taken into consideration therein, and a measurement illumination condition "M1" with ultraviolet light taken into consideration therein.

In a case where the measurement illumination condition is M0, a colorimetric value of an image, which is formed on a sheet that does not contain an optical brightening agent (OBA) and is using a color material (e.g., toner), that is measured under the condition correlates with an appearance perceived by human eyes. However, a colorimetric value of an image, which is formed on a sheet that contains the OBA having a fluorescent component susceptible to an influence of ultraviolet light, has an inappropriate correlation with the appearance perceived by the human eyes.

On the other hand, in a case where the measurement illumination condition is M1, a factor of ultraviolet light is taken into consideration in a result of the color measurement. Therefore, the colorimetric value of the image, which is formed on the sheet that does not contain the OBA and is using the color material such as toner, and the colorimetric value of the image, which is formed on the sheet that contains the OBA and is using the color material such as toner, both measured under the condition, have appropriate correlations with the appearance perceived by human eyes.

These circumstances have led to a recent increase in cases where the measurement illumination condition M1 is used.

Figure 10A:
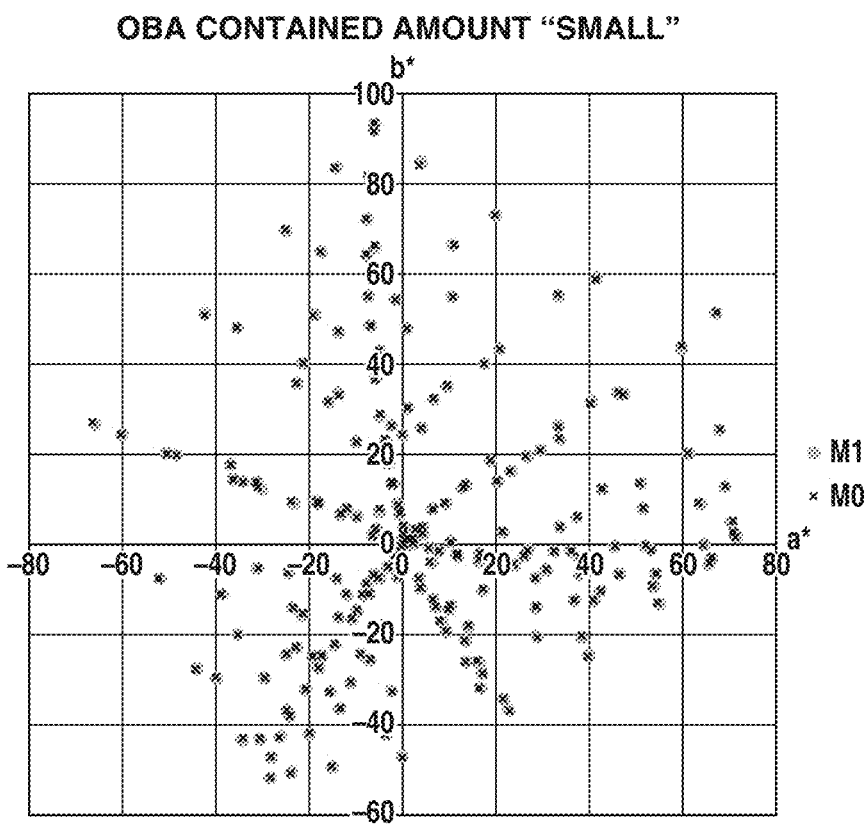
FIGS. 10A and 10B are each a graph of a chromaticity distribution illustrating a relationship between a contained amount of an optical brightening agent (OBA) and measurement illumination condition.
Figure 10B:
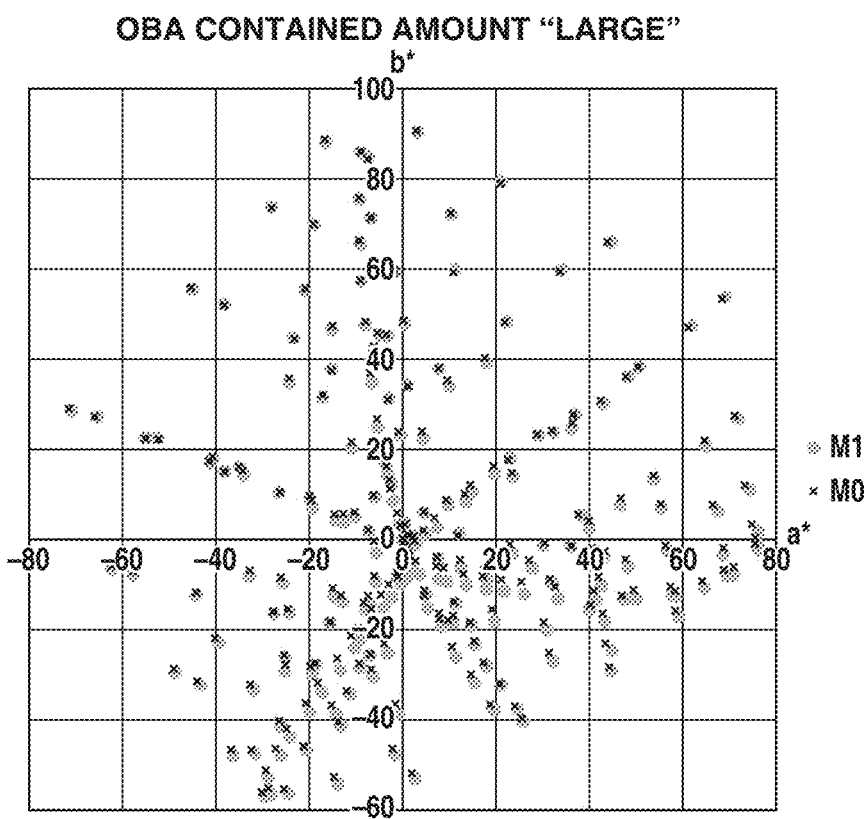

FIGS. 10A and 10B illustrate that a measured value varies depending on a difference in a contained amount of OBA when the measurement illumination condition is switched.

L*a*b* chromaticity values of color patches printed on a sheet containing a small amount of the OBA and a sheet containing a large amount of the OBA were measured under the measurement illumination conditions M0 and M1 using an ii Pro 2 spectrophotometer manufactured by X-Rite Incorporated, which can change a light source.

FIGS. 10A and 10B each illustrate a graph of a chromaticity distribution on which a result of this color measurement is plotted on an a*b* plane.

On the sheet containing the large amount of the OBA (illustrated in FIG. 10B) compared to the sheet containing the small amount of the OBA (illustrated in FIG. 10A), a large difference was generated between a result of the color measurement under the measurement illumination condition M0 and a result of the color measurement under the measurement illumination condition M1.

On the sheet containing the large amount of the OBA, a measurement error equivalent to approximately a color difference $\Delta E=2.5$ may occur as a result of measuring, for example, a paper white portion.

The value of $\Delta E=2.5$ is extremely large as a color difference in the colorimetric value, and raises a problem with color management, such as a change in a color of an output and non-conformity of accuracy in color verification due to a decrease in accuracy of profile generation.

In recent years, there have been apparatuses configured to include a spectrophotometer (hereinafter referred to as an in-line sensor) built in an image forming apparatus and carry out the color measurement at the same time as printing the color patch.

On the in-line sensor, strict criteria may be imposed in terms of a size and a price of a unit. Thus, the in-line sensor is often simply configured, such as being equipped with only one type of light source and being capable of measuring only under a fixed measurement illumination condition (i.e., a characteristic of the light source is fixed).

However, in a case where the measurement illumination condition of the employed color measurement device is fixed to M0, when the color measurement is carried out on the sheet specified to be measured under the measurement illumination condition M1 and containing the OBA therein, the measurement may yield the colorimetric value unable to correlate with the appearance, thereby resulting in a failure to support appropriate color management as described above.

Exemplary embodiments of the present disclosure have been made in consideration of the above-described problem, and are directed to acquiring a colorimetric value appropriate for a measurement illumination condition without being affected by the influence of the contained amount of the OBA in the sheet even when the measurement illumination condition of the employed color measurement device is fixed to M0.

In the following description, exemplary embodiments for implementing the present disclosure will be described with reference to the drawings.

[Hardware Configuration of Image Processing System]

Figure 1:
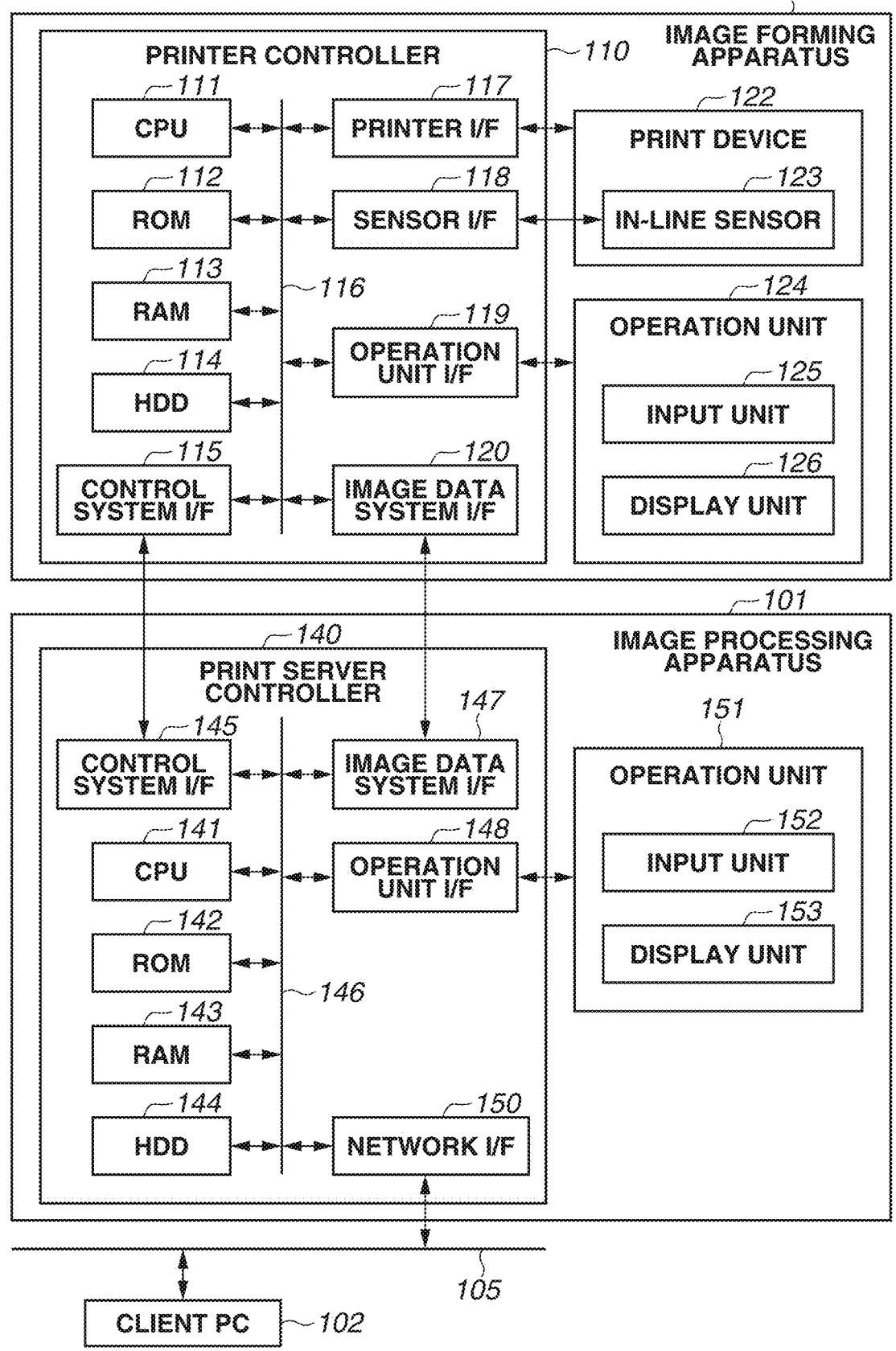
FIG. 1 is a block diagram illustrating a hardware configuration of an image processing system.

FIG. 1 is a block diagram illustrating a hardware configuration of an image processing system according to a first exemplary embodiment of the present disclosure.

A printer controller 110 is a printer controller of the image forming apparatus 100. A central processing unit (CPU) 111, which may include one or more processors, one or more memories, circuitry, or a combination thereof, may comprehensively control access to various kinds of devices connected to a system bus 116 based on a control program stored in a read only memory (ROM) 112 or a hard disk drive (HDD) 114. The ROM 112 stores, for example, the control program executable by the CPU 111 therein. A random access memory (RAM) 113 mainly functions as a main memory, a work area, and the like of the CPU 111, and is configured to be able to extend its own memory capacity by an optional RAM connected to a not-illustrated extension port. The HDD 114 stores a boot program, various kinds of applications, font data, a user file, an editing file, and/or the like therein. Although the HDD 114 is used in the present exemplary embodiment, a Secure Digital (SD) card, a flash memory, or the like may be used as an external storage device instead of the HDD 114. A control system interface (I/F) 115 receives information for print control from an image processing apparatus 101. A printer I/F 117 controls an image output to a print device 122. An operation unit I/F 119 controls a display on a display unit 126 included in an operation unit 124 and controls an input of various kinds of setting information set on an input unit 125. An image data system I/F 120 receives, from the image processing apparatus 101, image data to be transmitted to the print device 122.

A sensor I/F 118 transmits an operation instruction directed to an in-line sensor 123 mounted inside the print device 122, and receives a result measured by the in-line sensor 123. The in-line sensor 123 will be described below.

A print server controller 140 performs processing to achieve print processing in the image processing apparatus 101, such as an analysis of an input print job and processing for rasterizing the print job into image data. A CPU 141, which may include one or more processors, one or more memories, circuitry, or a combination thereof, may comprehensively control access to various kinds of devices connected to a system bus 146 based on a control program stored in a ROM 142 or the HDD 144. The ROM 142 stores, for example, the control program executable by the CPU 141 therein. A RAM 143 mainly functions as a main memory, a work area, and the like of the CPU 141, and is configured to be able to extend its own memory capacity by an optional RAM connected to a not-illustrated extension port. The HDD 144 stores a boot program, various kinds of applications, font data, a user file, an editing file, and/or the like therein. Although the HDD 144 is used in the present exemplary embodiment, an SD card, a flash memory, or the like may be used as an external storage device instead of the HDD 144.

A control system I/F 145 transmits information for print control to the image forming apparatus 100.

An image data system I/F 147 transmits the image data to cause the print device 122 to output to the image forming apparatus 100.

An operation unit I/F 148 controls a display on a display unit 153 included in an operation unit 151, and controls an input of various kinds of setting information set on an input unit 152. In the present example, the image forming apparatus 100 and the image processing apparatus 101 include the independent operation units 124 and 151, respectively, but may be configured to share common hardware as the operation units of both of them.

A network I/F 150 carries out data communication with an external network 105 via a network cable.

A client personal computer (PC) 102 is connected to the image processing apparatus 101 via the external network 105. The client PC 102 inputs the print job to the image processing apparatus 101.

[Hardware Configuration of in-Line Sensor]

Figure 2:
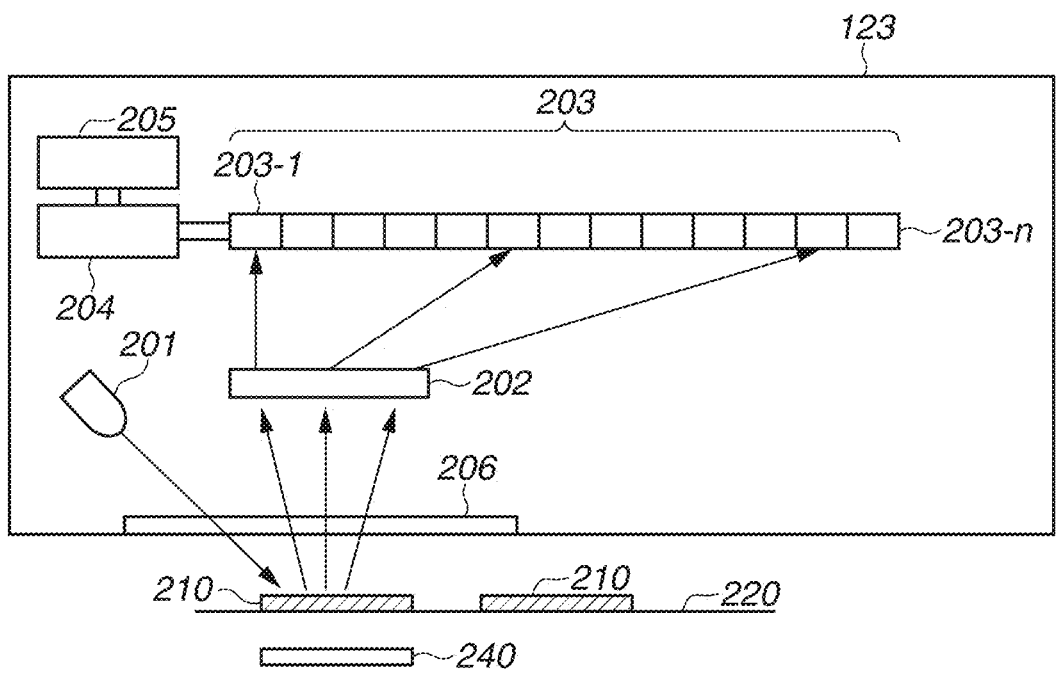
FIG. 2 is a diagram illustrating a hardware configuration of an in-line sensor.

FIG. 2 illustrates a hardware configuration of the in-line sensor 123 mounted inside the print device 122. The in-line sensor is also commonly called an ILS. The in-line sensor 123 is set up in a sheet conveyance path of the print device 122, and is placed at a position in the sheet conveyance path between a fixing unit (not illustrated) and a discharge port (not illustrated).

The in-line sensor 123 includes a white light-emitting diode (LED) 201, a diffractive grating 202, a line sensor 203 (i.e., 203-1 to 203-n (n is an arbitrary number)), a calculation unit 204, and a memory 205. The white LED 201 irradiates a measurement image 210 on a sheet 220 with light.

The diffractive grating 202 diffracts light reflected from the measurement image 210 on a wavelength-by-wavelength basis. The line sensor 203 includes n pieces of light receiving elements (i.e., n pixels). The calculation unit 204 carries out various kinds of calculations based on a light intensity value of each of the pixels in the line sensor 203. The memory 205 stores various kinds of data therein.

The in-line sensor 123 detects a light intensity of the reflected light in a range from 380 [nm] to 720 [nm] at an interval of 10 [nm]. In this case, n is 34. The calculation unit 204 includes a spectral calculation unit that calculates a spectral reflectance based on the light intensity value of each of the pixels in the line sensor 203 and an Lab calculation unit that calculates L*a*b* values. The in-line sensor 123 may include a lens 206 that collects the light emitted from the white LED 201 onto the measurement image 210 on the sheet 220 and/or collects the light reflected from the measurement image 210 onto the diffractive grating 202.

The in-line sensor 123 includes a white reference plate 240 mainly made from alumina (i.e., aluminum oxide). The in-line sensor 123 adjusts a light amount of the white LED 201 with use of the white reference plate 240. For example, the in-line sensor 123 causes the white LED 201 to emit the light without the sheet 220 passing through a measurement position of the in-line sensor 123, and receives light reflected from the white reference plate 240 by the line sensor 203. The calculation unit 204 adjusts a light emission intensity of the white LED 201 in such a manner that a light intensity value of a predetermined pixel in the line sensor 203 matches a predetermined value.

Figure 3:
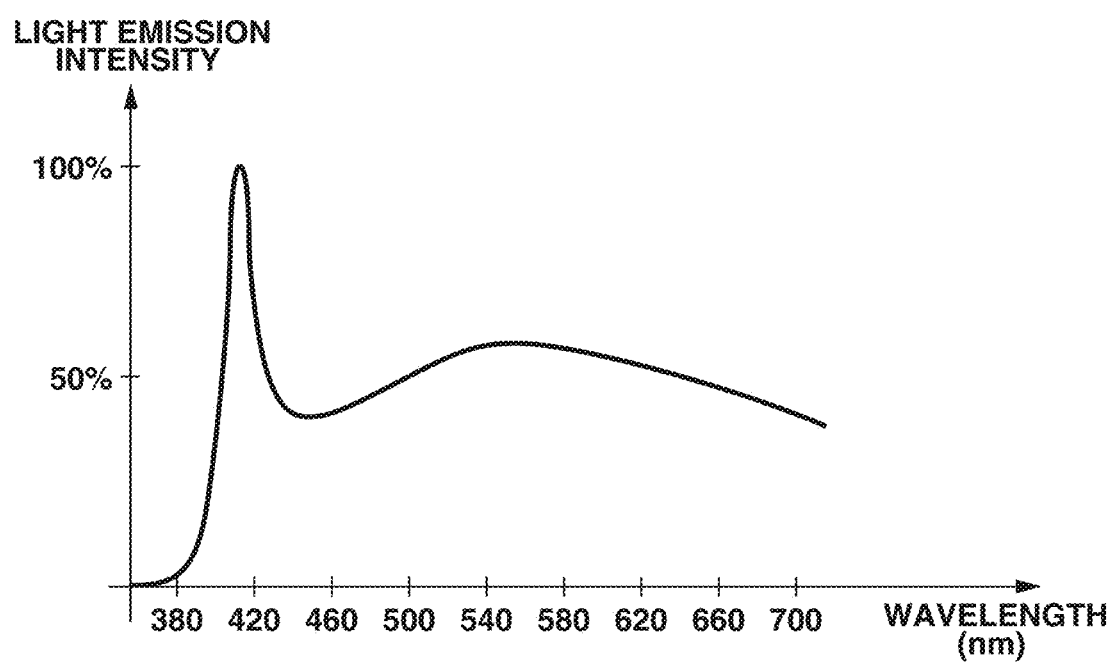
FIG. 3 is a characteristic diagram illustrating a distribution of a light emission intensity of a white light-emitting diode (LED).

FIG. 3 illustrates a distribution of a light emission intensity of a white LED. A horizontal axis represents a wavelength of light emitted from the white LED, and a vertical axis represents the light emission intensity. The white LED 201 is characterized by being a light source having light at a short wavelength of 400 nm or shorter susceptible to the influence of an optical brightening agent contained in paper.

In the in-line sensor 123, the characteristic (i.e., the wavelength) of the light source is fixed, and this can be said to be equivalent to a case when the measurement illumination condition is M0.

[Software Configuration of Image Forming Apparatus]

Figure 4:
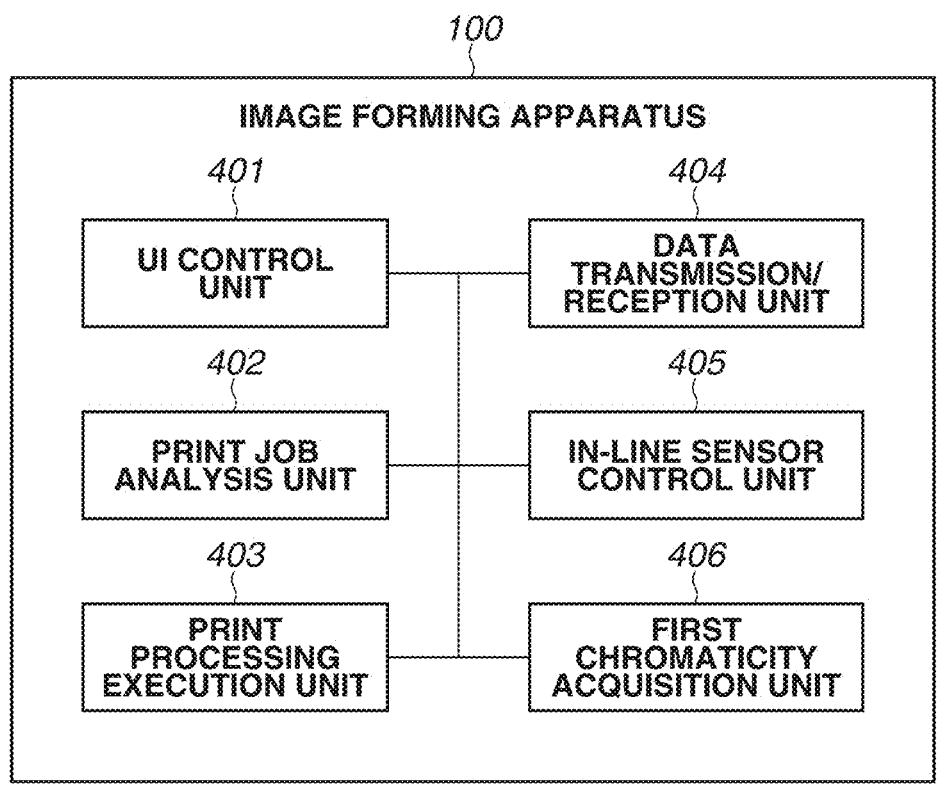
FIG. 4 is a block diagram illustrating a software configuration of an image forming apparatus.

FIG. 4 is a block diagram illustrating a software module configuration of the image forming apparatus 100 according to the present exemplary embodiment. These software modules are stored in the HDD 114 as a program, and are read out into the RAM 113 to be executed by the CPU 111.

A user interface (UI) control unit 401 controls the display on the display unit 126 in the operation unit 124 and controls the input of the various kinds of setting information set on the input unit 125 via the operation unit I/F 119.

A print job analysis unit 402 analyzes data of the print job received from the image processing apparatus 101.

A print processing execution unit 403 controls a series of print operations such as sheet feeding, sheet conveyance, printing, and sheet discharge. The print operations are carried out by the print device 122 with respect to the analyzed print job.

A data transmission/reception unit 404 controls data transmission/reception between the image forming apparatus 100 and the image processing apparatus 101. Examples of the transmitted/received data include the data of the print job and the chromaticity data acquired from the measurement by the in-line sensor 123.

An in-line sensor control unit 405 controls the measurement operation of the in-line sensor 123 mounted on the image forming apparatus 100. By controlling the in-line sensor 123 at a preprogrammed timing, spectral information of a predetermined color patch printed on the sheet is acquired.

A first chromaticity acquisition unit 406 acquires a predetermined chromaticity value from the spectral information acquired by the in-line sensor control unit 405 with use of the in-line sensor 123. The chromaticity value refers to, for example, L*a*b*.

As described above, the in-line sensor in which the light source is fixed can acquire only spectral information based on one type of light source. Accordingly, only one type of chromaticity value is also acquired from the acquired spectral information based on one type of light source. In the present exemplary embodiment, the image processing system uses the in-line sensor employing the white LED as the light source thereof. Therefore, a first chromaticity value is considered as a value acquired under a condition equivalent to the measurement illumination condition M0.

[Software Configuration of Image Processing Apparatus]

Figure 5:
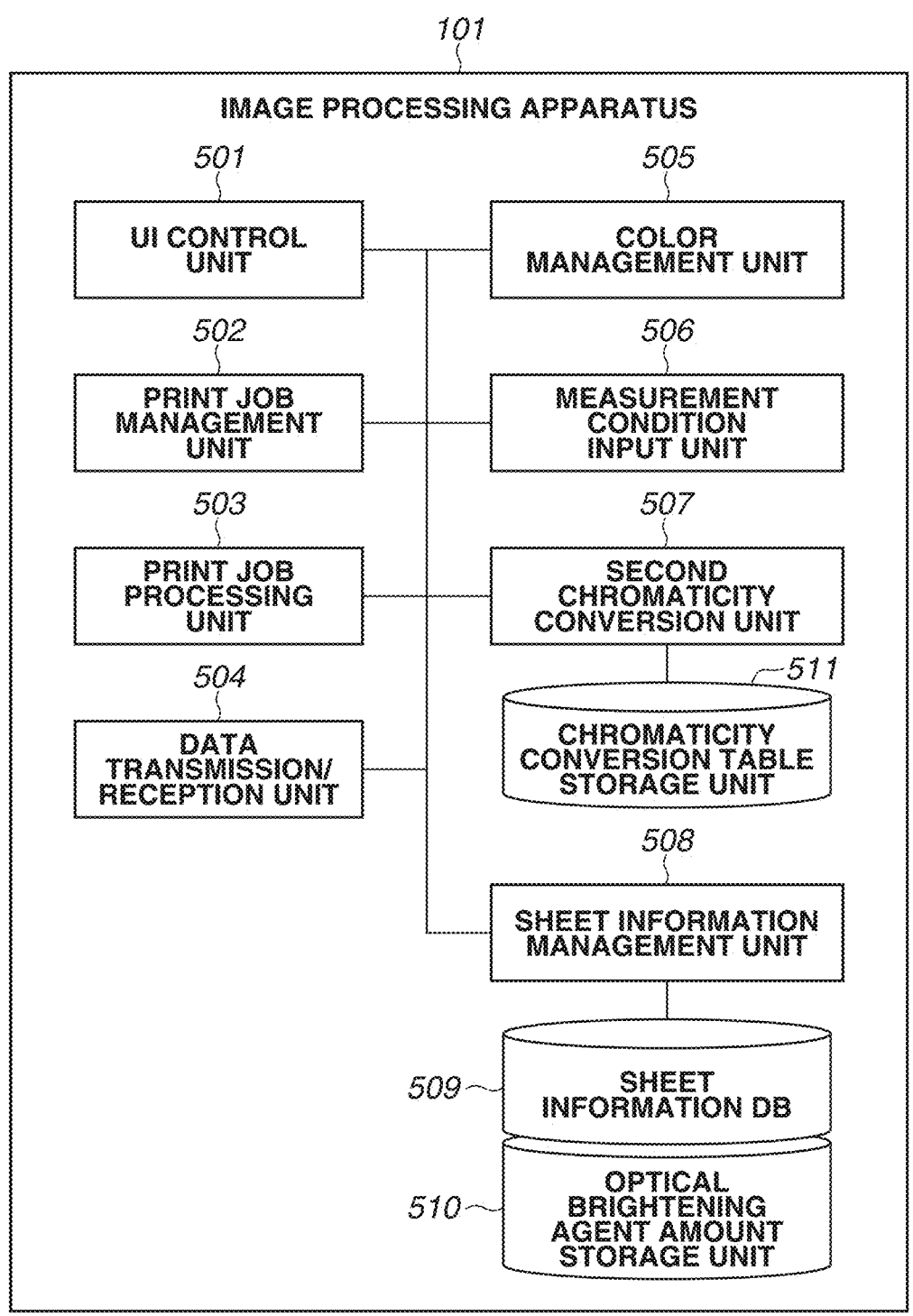
FIG. 5 is a block diagram illustrating a software configuration of an image processing apparatus.

FIG. 5 is a block diagram illustrating a software module configuration of the image processing apparatus 101 according to the present exemplary embodiment. These software modules are stored in the HDD 144 as a program, and are read out into the RAM 143 and executed by the CPU 141.

A UI control unit 501 controls the display on the display unit 153 in the operation unit 151 and controls the input of the various kinds of setting information set on the input unit 152 via the operation unit I/F 148.

A print job management unit 502 manages the print job data received from a user. Specifically, the print job management unit 502 performs processing such as calling the print job stored in the HDD 144, reflecting a change in a setting of the print job, and managing a history of an already printed job.

A print job processing unit 503 performs the processing to achieve the print processing, such as analyzing the print job received from the user, rasterizing the print job into the image data, and compressing/decompressing the image data.

A data transmission/reception unit 504 manages transmission/reception of various kinds of data between the image forming apparatus 100 and the image processing apparatus 101. The print job data generated by the print job processing unit 503 is transmitted to the image forming apparatus 100 by the data transmission/reception unit 504. Further, the data transmission/reception unit 504 manages data transmission/reception with the client PC 102 connected through the external network 105 via the network I/F 150.

A color management unit 505 controls and performs various kinds of color management processing to maintain and manage an image quality regarding a color impression in the image processing system. The color management processing refers to, for example, color confirmation processing for detecting a state about a color of an image currently output from the image forming apparatus 100 and calibration processing performed to improve the color into an appropriate state, or processing for generating a color profile. In any of these kinds of processing, the color management processing should acquire the chromaticity value of the predetermined color patch formed and printed on the sheet. The color management unit 505 further acquires a difference between the acquired chromaticity value and a target chromaticity value, updates calibration data so as to acquire a chromaticity value closer to the target chromaticity value, and generates the color profile.

A measurement condition input unit 506 receives a setting value for the measurement illumination condition when the color of the image is measured, which is required on the color management unit 505. The measurement illumination condition described here refers to a setting value of M that is the measurement illumination condition about color measurement devices defined by the above-described ISO 13655-2009 standard (hereinafter referred to as an M factor).

A second chromaticity conversion unit 507 performs processing for converting the chromaticity value received from the image forming apparatus 100 and measured by the in-line sensor 123 into a second chromaticity value so as to allow the chromaticity value to conform with the above-described measurement condition. Conversion table information when the chromaticity value is converted is stored in a chromaticity conversion table storage 511. A detailed processing procedure of the conversion will be described below.

A sheet information management unit 508 manages information about the sheet used in the image processing system. The sheet information is stored in a sheet information database (DB) 509 as a collection of parameters indicating properties of the sheet, such as a name of the sheet, a size, a grammage, and a surface property. Generally, a certain number of pieces of sheet information are stored in advance by a supplier that manufactures and sells the image processing system. Thus, the user can read out and utilize the pieces of information as desired.

Further, a parameter indicating an amount of the optical brightening agent in the sheet, which is a characteristic of the present exemplary embodiment, is also similarly stored as an optical brightening agent amount storage 510, which is a part of the sheet information DB 509. In the present exemplary embodiment, the parameter indicating the amount of the optical brightening agent in the sheet includes three elements "none", "small", and "large", and one of them is stored in association with the sheet information. However, the optical brightening agent amount parameter is not limited to the three types, and may include, for example, two types of elements "not contained" and "contained", or further detailed four or more types of elements.

The parameter indicating the amount of the optical brightening agent according to the present exemplary embodiment is stored in advance by the supplier in the optical brightening agent amount storage 510 as a part of the sheet information parameters based on information regarding the amount of the optical brightening agent announced by a sheet manufacturer or distributor.

[Flowchart Regarding Processing Performed by Image Forming Apparatus]

Figure 6:
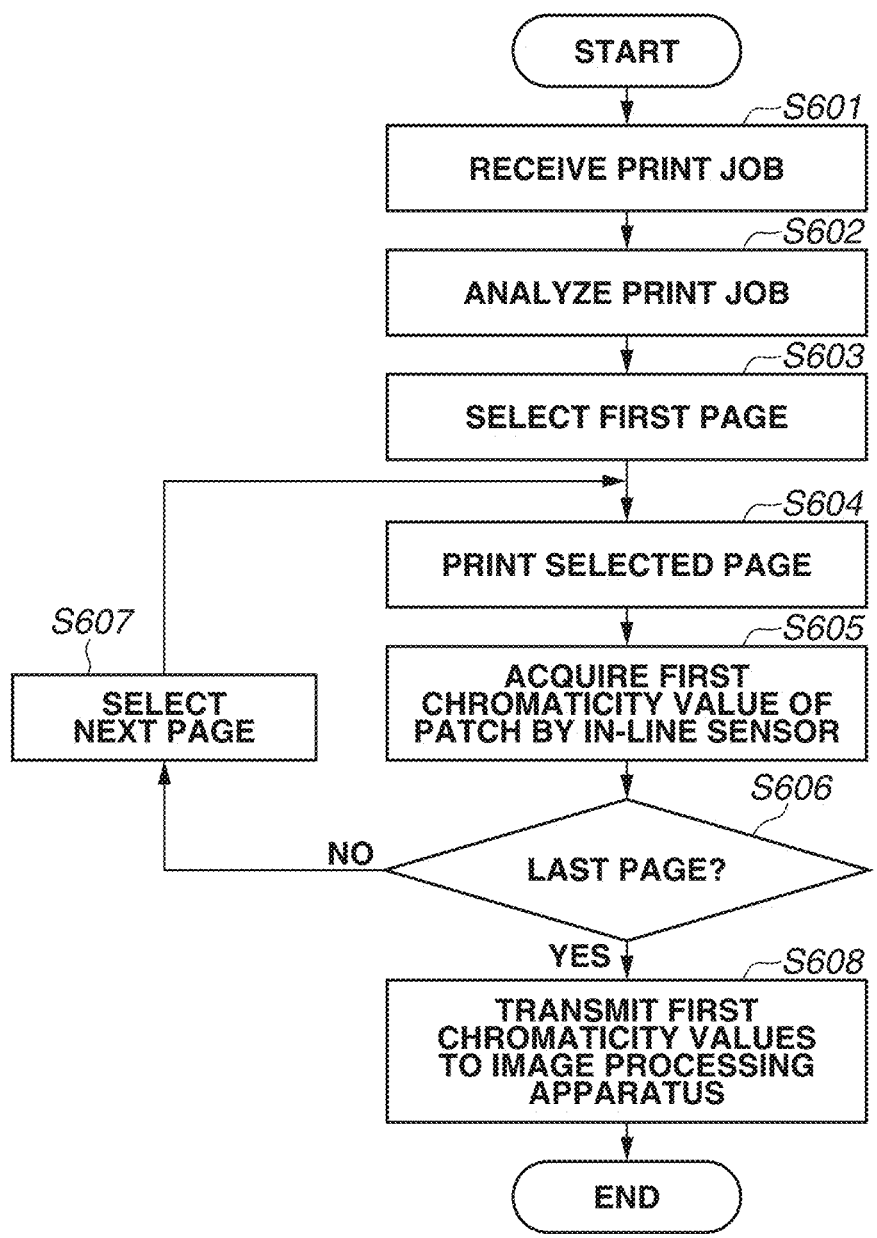
FIG. 6 is a flowchart illustrating processing from printing of a chart to patch measurement processing by the image forming apparatus.

FIG. 6 is a flowchart illustrating processing including operations from reception of an instruction to print a color patch chart to acquisition of colorimetric values of the patches by the in-line sensor 123 (i.e., acquisition of the color values) and transmission to the image processing apparatus 101 that are performed by the image forming apparatus 100 according to the present exemplary embodiment. In the image forming apparatus 100, the program stored in the HDD 114 is read out into the RAM 113 and executed by the CPU 111 to implement the processing of flowchart. The processing illustrated in the present flowchart is started by the image forming apparatus 100 receiving a print job transmitted in step S703 performed by the image processing apparatus 101, which will be described below.

In step S601, the CPU 111 receives the print job to print the color patch chart from the image processing apparatus 101 via the data transmission/reception unit 404.

In step S602, the CPU 111 analyzes the received print job by the print job analysis unit 402. In step S603, the CPU 111 selects the first page in the print job.

In step S604, the CPU 111 prints the selected page by the print processing execution unit 403. The print processing execution unit 403 forms the color patch with toner onto a print sheet according to analyzed page information and fixes it by the print device 122, and outputs the resultant sheet to a not-illustrated discharge destination connected to the print device 122.

In step S605, the CPU 111 carries out the color measurement on the fixed color patch printed on the sheet. In the measurement, the CPU 111 measures a spectral value with use of the in-line sensor 123 by the in-line sensor control unit 405. Then, the CPU 111 acquires a chromaticity value from the spectral value measured with use of the in-line sensor 123 by the first chromaticity acquisition unit 406. The chromaticity value acquired at this time is, for example, the L*a*b* values.

Next, a method for acquiring L*a*b* by the first chromaticity acquisition unit 406 will be described. The calculation unit 204 included in the in-line sensor 123 acquires an absolute spectral reflectance ARP ($\lambda$) with use of the following values.

That is, the calculation unit 204 uses a detection result P ($\lambda$) of the line sensor 203 corresponding to the reflected light from the measurement image 210, a detection result W ($\lambda$) of the line sensor 203 corresponding to the reflected light from the white reference plate 240, and an absolute spectral reflectance ARW ($\lambda$) of the white reference plate 240 itself. The absolute spectral reflectance ARW ($\lambda$) indicates a reflectance when barium sulfate, which is a perfect diffusion sample, is assumed to be 100%. The absolute spectral reflectance ARP ($\lambda$) of the measurement image 210 is acquired based on a formula (1) with use of these values.

$$ARP(\lambda)=P(\lambda)/W(\lambda)\times ARW(\lambda) \tag{1}$$

The calculation unit 204 converts the above-described absolute spectral reflectance ARP ($\lambda$) into L*a*b* according to the calculation method defined by ISO 13655. In the present exemplary embodiment, Japanese Industrial Standards (JIS) Z 8701 is used as a color-matching function, and SD50 ($\lambda$) defined by JIS Z 8720 is used as a standard light spectral distribution.

XYZ values are acquired from the calculation using the color-matching function and SD50 on the absolute reflectance at each wavelength, and are converted into the L*a*b* values.

In step S606, the CPU 111 checks whether the currently selected and processed page is the last page in the print job. If the current page is the last page (YES in step S606), the processing proceeds to step S608. If not (NO in step S606), in step S607, the CPU 111 selects the next page. Then, the processing proceeds to step S604.

In step S608, the CPU 111 transmits, to the image processing apparatus 101, the chromaticity values with respect to all of the color patches in the print job that have been acquired by the first chromaticity acquisition unit 406. Then, the processing ends.

[Flowchart regarding Processing Performed by Image Processing Apparatus]

Figure 7:
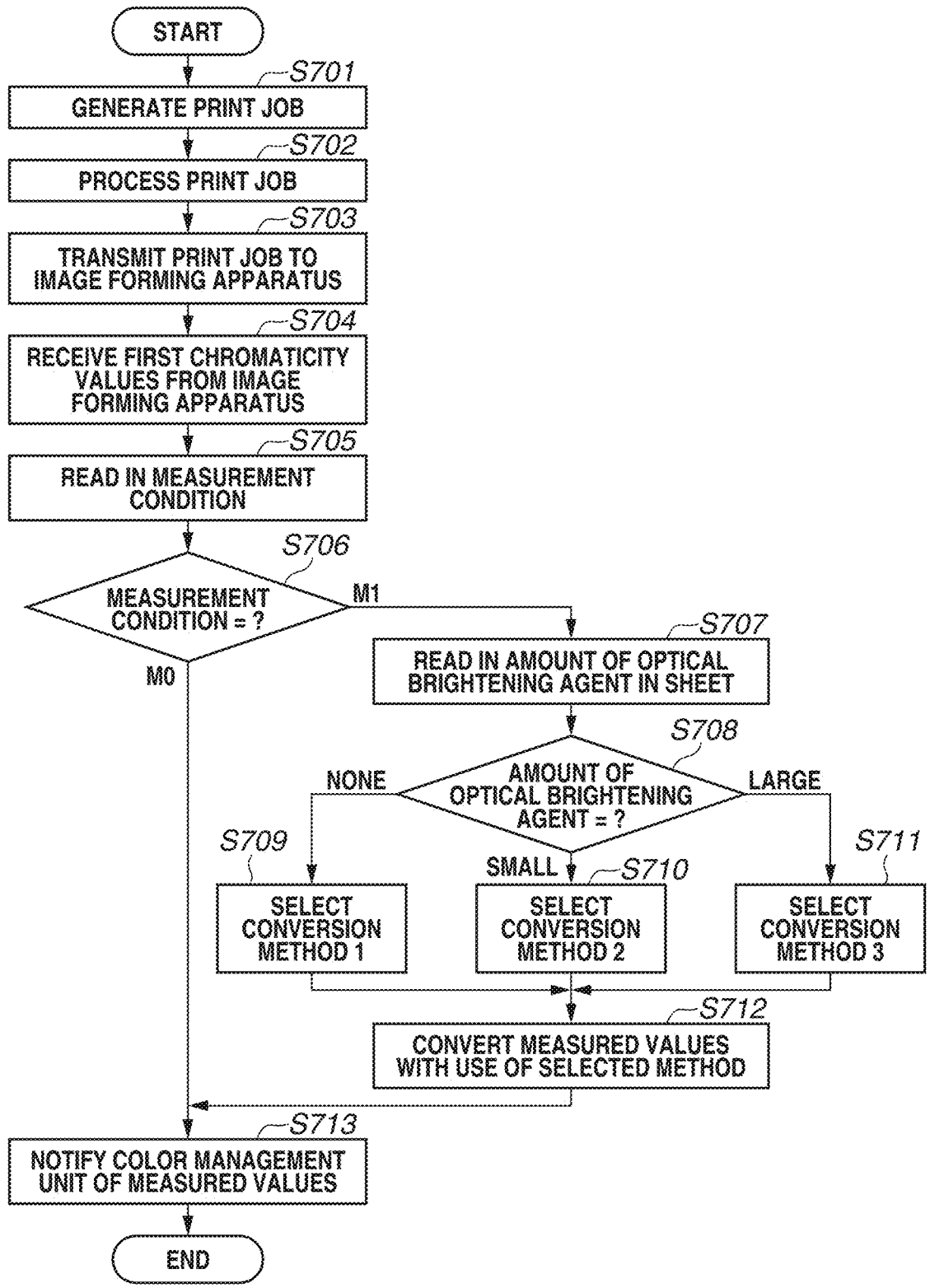
FIG. 7 is a flowchart illustrating processing from the printing of the chart to the patch measurement processing by the image processing apparatus.

FIG. 7 is a flowchart illustrating processing including operations from the instruction to print the color patch chart to acquisition of the measured values that are performed by the image processing apparatus 101 according to the present exemplary embodiment. In the image processing apparatus 101, the program stored in the HDD 144 is read out into the RAM 143 and is executed by the CPU 141 to implement the flowchart. The flowchart is started by the color management unit 505 issuing the instruction to print the color patch chart.

FIG. 8 illustrates one example of a UI for receiving the condition about the printing and the measurement of the color patch chart used in the present exemplary embodiment. The UI is controlled by the UI control unit 501 in the image processing apparatus 101, and is displayed on the display unit 153 via the operation unit 151. For example, when execution of arbitrary color management processing is received by the color management unit 505 from the user via a UI (not-illustrated), the color management unit 505 displays a UI like an example illustrated in FIG. 8 to receive settings regarding the color patch chart. In the present example, the user specifies a patch set UI 802 for specifying the number of patches to be printed, a patch size UI 803 for specifying a size of the sheet used to print the chart in which the patches are formed, and a measurement condition UI 804 for specifying a condition about an output of the measured values of the printed chart. The specified parameters are not limited to these examples. For example, the image processing apparatus 101 may be configured to allow the user to specify any parameter to print the color patch chart, such as information about a sheet type, from the screen of UI 801. When a cancel button UI 805 is pressed, the color management unit 505 ends the display of the UI 801. When a printing and measurement button UI 806 is pressed, the color management unit 505 generates the print job for printing the color patch chart and starts processing for printing and measuring the color patch chart according to the flowchart described below.

In step S701, the CPU 141 generates the print job for the color patch chart based on the specified settings. A structure of the generated print job is determined based on information including the patch set, the patch size, and the like input on the UI 801.

In step S702, the CPU 141 performs the print processing such as the rasterization processing on the generated print job in the print job processing unit 503.

In step S703, the CPU 141 transmits the print job data processed by the print processing to the image forming apparatus 100 via the data transmission/reception unit 504. The CPU 141 may transmit patch structure information (i.e., information about the number of patches and a layout) of the color patch chart to transmit as the print job to the image forming apparatus 100 to allow the in-line sensor control unit 405 of the image forming apparatus 100 to utilize the information as necessary.

In step S704, the CPU 141 receives the first chromaticity values with respect to all of the printed color patches from the image forming apparatus 100 via the data transmission/reception unit 504.

In step S705, the CPU 141 reads the measurement condition input by the measurement condition input unit 506. The measurement condition is the value set in the measurement condition UI 804 as illustrated in FIG. 8, and the value of the M factor described above. In the present exemplary embodiment, M0 or M1 is selected. M0 indicates the measurement condition without ultraviolet light taken into consideration therein. M1 indicates the measurement condition with ultraviolet light taken into consideration therein.

In S706, the CPU 141 determines the read measurement condition. If the measurement condition is "M0" (M0 in step S706), the processing proceeds to step S713. If the measurement condition is "M1" (M1 in step S706), the processing proceeds to step S707.

In step S707, the CPU 141 reads the optical brightening agent amount parameter of the sheet, which has been used to print the color patch chart, from the optical brightening agent amount storage 510 by the second chromaticity conversion unit 507. In step S708, the CPU 141 selects a conversion method according to the read optical brightening agent amount parameter. Then, the processing proceeds to one of steps S709 to S711. If the optical brightening agent amount parameter is "none" (NONE in step S708), the processing proceeds to step S709, in which the CPU 141 selects a conversion table, corresponding to the parameter "none", for converting the first chromaticity values into the second chromaticity values. If the optical brightening agent amount parameter is "small" (SMALL in step S708), the processing proceeds to step S710, in which the CPU 141 selects a conversion table, corresponding to the parameter "small", for converting the first chromaticity values into the second chromaticity values. If the optical brightening agent amount parameter is "large" (LARGE in step S708), the processing proceeds to step S711, in which the CPU 141 selects a conversion table, corresponding to the parameter "large", for converting the first chromaticity values into the second chromaticity values.

In step S712, the CPU 141 converts, with respect to the chromaticity values received in step S704, from the first chromaticity values into the second chromaticity values with use of the conversion table selected in any of steps S709 to S711 by the second chromaticity conversion unit 507.

Next, the method for converting the first chromaticity values into the second chromaticity values will be described.

Assume that the first chromaticity values and the second chromaticity values are based on $L^*a^*b^*$, and that ($L1^*$, $a1^*$, $b1^*$) represent the first chromaticity values and ($L2^*$, $a2^*$, $b2^*$) represent the second chromaticity values. In the present exemplary embodiment, the conversion from the first chromaticity values into the second chromaticity values is performed by direct mapping using a look-up table. A relationship when the first chromaticity values ($L1^*$, $a1^*$, $b1^*$) are converted into the second chromaticity values ($L2^*$, $a2^*$, $b2^*$) is stored in advance in the chromaticity conversion table storage 511 as a table. Then, the chromaticity values of the measured first chromaticity values are converted with use of a conversion relationship at a closest position of chromaticity values in the chromaticity conversion table as a distance in the $L^*a^*b^*$ space. Alternatively, the second chromaticity values after the conversion may be calculated from a weighted average with use of conversion relationships located at neighboring several positions. The look-up table in which the conversion relationship is written is prepared as a different table for each of the individual conversion steps S709, S710, and S711.

As described in the above example of the comparison of the measured values, the relationship of the chromaticity values varies according to the contained amount of the optical brightening agent and the measurement condition. Thus, if the chromaticity values are converted with use of a single (common) conversion table independent of the amount of the optical brightening agent without the amount of the optical brightening agent taken into consideration, a variation undesirably occurs in accuracy of the chromaticity values after the conversion. Therefore, the conversion method is switched with use of the plurality of conversion tables in consideration of the relationship of the chromaticity values according to the amount of the optical brightening agent. The conversion table information is determined in advance by the supplier and is stored in the chromaticity conversion table storage 511.

In the present exemplary embodiment, the method for converting the chromaticity values has been described as the direct mapping method using the look-up table, but is not limited thereto and another method may be used therefor. Examples of the other method include converting the chromaticity values as a matrix calculation in the following manner. In the following formula, p1 to p3 represent calculation matrix coefficients. The respective coefficients of the conversion methods S709, S710, and S711 are value set in consideration of influence of the optical brightening agent. Therefore, a part or all of the coefficients are set to different coefficients according to the amount of the optical brightening agent.

$$(L2* \quad a2* \quad b2*) = \begin{pmatrix} p1 \\ p2 \\ p3 \end{pmatrix} (L1* \quad a1* \quad b1*) \quad (2)$$

In the case of the method, the chromaticity conversion processing can be achieved by storing each of the matrix calculation coefficients in a storage unit equivalent to the chromaticity conversion table storage 511 in advance instead of the above-described look-up table.

After the CPU 141 converts the first chromaticity values into the second chromaticity values in step S712, or if the measurement condition is "M0" (M0 in step S706), in step S713, the CPU 141 notifies the color management unit 505 of the determined chromaticity values. Then, the processing ends.

The processing enables the color management unit 505 to perform desired color management processing by using the second chromaticity values in conformity with the measurement condition acquired in this flow.

The above-described image processing system allows the chromaticity value to be acquired in conformity with the measurement condition set according to the intended use in consideration of the influence of the amount of the optical brightening agent contained in the sheet even when the color measurement is carried out with use of the in-line sensor in which the light source is fixed. Accordingly, stable color management processing can be performed regardless of the contained amount of the optical brightening agent.

In the first exemplary embodiment, the image processing system has been described assuming that the sheet information and the parameter indicating the amount of the optical brightening agent contained in the sheet are stored in advance by the supplier in the sheet information DB 509 and the optical brightening agent amount storage 510.

A second exemplary embodiment of the present disclosure will be described as an image processing system that allows these pieces of information to be input from outside.

The image processing system according to the present exemplary embodiment shares a common hardware configuration and the image forming apparatus 100 shares a common software configuration with the first exemplary embodiment, and therefore descriptions thereof will be omitted below. The software configuration of the image processing apparatus 101 is approximately similar to FIG. 5 according to the first exemplary embodiment, and therefore will be described below focusing only on differences therefrom.

In the present exemplary embodiment, the image processing system includes a sheet information input unit (not illustrated) in the image processing apparatus 101. The sheet information input unit is stored in the HDD 144 as a computer program, and is read out into the RAM 143 and executed by the CPU 141. The sheet information input unit receives the sheet information from outside, and stores the information into the sheet information DB 509 and the optical brightening agent amount storage 510.

FIG. 9 illustrates one example of a UI for inputting the sheet information according to the present exemplary embodiment. A display on the UI is controlled by the UI control unit 501 in the image processing apparatus 101, and is presented on the display unit 153 via the operation unit 151.

When the CPU 141 is instructed to start registering the sheet information by the user via a UI screen (not-illustrated), the CPU 141 displays a UI 901 on the display unit 153. A UI 902 to a UI 905 are one example of sheet information parameters to register, and are parameters of the sheet indicating the name, the grammage, the size, and the surface property, respectively. When a change button is pressed by the user, the CPU 141 becomes ready to receive an input, and displays the received parameter at each portion in the UI 901. The parameters to be registered are not limited to the examples, and may include another parameter indicating a property of the sheet, such as a color, a transfer voltage setting value, and a registration correction value.

A UI 906 is a portion where the parameter indicating the amount of optical brightening agent is registered, which is a characteristic of the present exemplary embodiment. The input is received by the CPU 141 and a result thereof is displayed in the same manner as the other sheet information parameters.

A UI 908 is a registration button. When the registration button UI 908 is pressed by the user, the CPU 141 stores the parameter information input to the UI 902 to the UI 906 into the sheet information DB 509 and the optical brightening agent amount storage 510.

A UI 907 is a cancel button. When the cancel button UI 907 is pressed by the user, the CPU 141 ends the display of the UI 901.

The above-described image processing system allows the sheet information including the amount of the optical brightening agent to be input from outside thereof and registered with the sheet information DB 509. This configuration allows effects similar to the above-described first exemplary embodiment to be acquired even when the image processing system uses various kinds of sheets (i.e., sheets containing different amounts of optical brightening agent) that the user desires to use.

In the first and second exemplary embodiments, the image processing system has been described based on such a configuration that the image processing system converts the first chromaticity values measured by the image forming apparatus 100 into the second chromaticity values by the image processing apparatus 101. However, the configuration is not limited thereto. For example, instead of performing the conversion processing of the second chromaticity values by the image processing apparatus 101, the conversion processing may be performed by the image forming apparatus 100.

In the configuration, instead of using the image processing apparatus 101, the image forming apparatus 100 may perform the color management processing (e.g., the above-described color confirmation processing and calibration processing or processing for generating the color profile). The image forming apparatus 100 can perform the processing by having a similar configuration to the color management unit 505 described above.

Further, in a case where the color management of the image forming apparatus 100 is conducted by the image processing apparatus 101, the image processing apparatus 101 can perform the color management by receiving the second chromaticity values from the image forming apparatus 100 and using the values in the color management processing.

The exemplary embodiments of the present disclosure allow the chromaticity value to be acquired in conformity with the set measurement condition in consideration of the influence of the amount of the optical brightening agent contained in the sheet even when the image processing system uses the color measurement device in which the characteristic of the light source is fixed.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-114904, filed Jun. 15, 2018, which is hereby incorporated by reference herein in its entirety.

What is claimed is:

1. An image processing apparatus comprising:
    an acquisition unit configured to acquire lightness value and chromaticity value that are detecting results of a sheet obtained with use of a sensor in which a characteristic of a light source is fixed;
    a setting unit configured to set an illuminant condition for converting the detecting result;
    a receiving unit configured to receive, from a user, an amount of an optical brightening agent contained in a sheet;
    a registration unit configured to register sheet information including a name of the sheet and the amount of the optical brightening agent received by the receiving unit; and
    a conversion unit configured to convert the lightness value and the chromaticity value acquired by the acquisition unit based on the set illuminant condition and the amount of the optical brightening agent included in the sheet information registered by the registration unit.

2. The image processing apparatus according to claim 1, wherein the sensor is a spectrophotometer in which a length of a wavelength of a light source is fixed.

3. The image processing apparatus according to claim 1, wherein the illuminant condition is a condition regarding a characteristic of illumination used when the sensor carries out color detection on the sheet.

4. The image processing apparatus according to claim 1, wherein, when the setting unit sets a different condition, the conversion unit uses a different conversion table for the lightness value and the chromaticity value.

5. The image processing method according to claim 1, wherein, when the setting sets a different condition, the converting uses a different conversion table for the lightness value and the chromaticity value.

6. An image processing method comprising:
    acquiring lightness value and chromaticity value that are detecting results of a sheet obtained with use of a sensor in which a characteristic of a light source is fixed;
    setting an illuminant condition for converting the detecting result;
    receiving an amount of an optical brightening agent contained in a sheet;

registering sheet information including a name of the sheet and the amount of the received optical brightening agent contained in the sheet based on a user instruction; and converting the acquired lightness value and the acquired chromaticity value based on the set illuminant condition and the amount of the optical brightening agent in the registered sheet information.

7. The image processing method according to claim 6, wherein the sensor is a spectrophotometer in which a length of a wavelength of a light source is fixed.

8. The image processing method according to claim 6, wherein the illuminant condition is a condition regarding a characteristic of illumination used when the sensor carries out color detection on the sheet.

* * * * *